United States Patent [19]

Weber et al.

[11] Patent Number: 5,710,216
[45] Date of Patent: Jan. 20, 1998

[54] THERMOPLASTIC MOLDING MATERIALS BASED ON PARTLY AROMATIC POLYAMIDES AND POLYMETHACRYLAMIDES

[75] Inventors: Martin Weber, Neustadt; Herbert Fisch, Wachenheim; Gunter Pipper, Bad Dürkheim; Axel Gottschalk, Neustadt, all of Germany

[73] Assignee: BASF Aktiengesellschaft, Ludwigshafen, Germany

[21] Appl. No.: 572,039

[22] Filed: Dec. 14, 1995

[30] Foreign Application Priority Data

Dec. 14, 1994 [DE] Germany .......................... 44 44 378.1

[51] Int. Cl.$^6$ ............................. C08L 33/10; C08L 77/06
[52] U.S. Cl. ........................... 525/132; 525/66; 525/80; 525/183; 525/187; 525/190
[58] Field of Search ........................... 525/66, 80, 132, 525/183, 187, 190

[56] References Cited

U.S. PATENT DOCUMENTS

| | | | |
|---|---|---|---|
| 4,415,706 | 11/1983 | Staas | 525/183 |
| 5,284,917 | 2/1994 | Yamamoto et al. | 525/113 |
| 5,344,868 | 9/1994 | Hallden-Abberton | 524/494 |
| 5,369,169 | 11/1994 | LaFleur et al. | 525/57 |

FOREIGN PATENT DOCUMENTS

| | | |
|---|---|---|
| 373 911 | 6/1990 | European Pat. Off. |
| 376 747 | 7/1990 | European Pat. Off. |
| 404 346 | 12/1990 | European Pat. Off. |
| 438 239 | 7/1991 | European Pat. Off. |
| 464 561 | 1/1992 | European Pat. Off. |

OTHER PUBLICATIONS

Japanese Abstract J 62 96 551.

*Primary Examiner*—Mark L. Warzel
*Attorney, Agent, or Firm*—Keil & Weinkauf

[57] ABSTRACT

Thermoplastic molding materials contain
A) from 1 to 98.5% by weight of a partly aromatic copolyamide,
B) from 1 to 98.5% by weight of a polymethacrylimide,
C) from 0.5 to 30% by weight of a polymeric component having OH groups,
D) from 0 to 60% by weight of fibrous or particulate fillers or mixtures thereof,
E) from 0 to 40% by weight of rubber impact modifiers and
F) from 0 to 40% by weight of conventional additives and processing assistants.

3 Claims, No Drawings

THERMOPLASTIC MOLDING MATERIALS BASED ON PARTLY AROMATIC POLYAMIDES AND POLYMETHACRYLAMIDES

The present invention relates to thermoplastic molding materials containing

A) from 1 to 98.5% by weight of a partly aromatic copolyamide,
B) from 1 to 98.5% by weight of a polymethacrylimide,
C) from 0.5 to 30% by weight of a polymeric component having OH groups,
D) from 0 to 60% by weight of fibrous or particulate fillers or mixtures thereof,
E) from 0 to 40% by weight of rubber impact modifiers and
F) from 0 to 40% by weight of conventional additives and processing assistants.

The present invention furthermore relates to the use of such thermoplastic molding materials for the production of fibers, films and moldings and to the fibers, films and moldings themselves which are thus obtainable.

Polymer blends comprising polyamides and polymethacrylimides are described in a number of publications.

U.S. Pat. No. 4,415,706 discloses, for example, blends of imidated acrylate polymers and aliphatic polyamides, which have improved toughness compared with polymethacrylimide and improved heat distortion resistance compared with polyamide.

Furthermore, EP-A 376 747 discloses blends of polyamides and polymethacrylimides.

The molding materials described in EP-A 404 346 contain a rubber having core-shell morphology as an impact modifier, in addition to polymethacrylimides and aliphatic polyamides.

JP 62/96551 relates to blends which contain a polyolefin component having acidic groups, in addition to polymethacrylimides and polyamides.

Finally, EP-A 464 561 describes blends of polyamides, polymethacrylimides, impact modifiers and epoxy-containing copolymers.

All these conventional molding materials are still unsatisfactory for use at elevated temperatures in conjunction with high atmospheric humidity.

It is an object of the present invention to provide thermoplastic molding materials based on polyamides and polymethacrylimides, which molding materials do not have the above disadvantages.

We have found that this object is achieved, according to the invention, by the thermoplastic molding materials as claimed in described below.

Component A

The novel molding materials contain, as component A, from 1 to 98.5, preferably from 5 to 94, in particular from 10 to 90, % by weight of a partly aromatic polyamide, ie. of a polyamide which is composed partly of monomers which contain an aromatic ring.

Such polyamides are known per se to a person skilled in the art and are described in the literature.

Only a few preferred examples of partly aromatic copolyamides are described in detail below.

First, partly aromatic copolyamides which may be mentioned here are those which contain from 20 to 90% by weight of units which are derived from terephthalic acid and hexamethylenediamine,
from 0 to 50% by weight of units which are derived from ε-caprolactam and
from 0 to 60% by weight of units which are derived from adipic acid and hexamethylenediamine, the two last-mentioned units accounting for at least 10% by weight of the total units.

A detailed description and a preferred preparation process for such polyamides appear in EP-A 299 444, to which reference is made here for further details.

A commercially available product from this group is Ultramid® T from BASF Aktiengesellschaft.

Further preferred partly aromatic copolyamides are those which are composed of from 65 to 85% by weight of units which are derived from terephthalic acid and hexamethylenediamine and
from 15 to 35% by weight of units which are derived from isophthalic acid and hexamethylenediamine or from 50 to 70% by weight of units which are derived from terephthalic acid and hexamethylenediamine and
from 10 to 20% by weight of units which are derived from adipic acid and hexamethylenediamine and
from 20 to 30% by weight of units which are derived from isophthalic acid and hexamethylenediamine.

Corresponding products are commercially available under the name Amodel®.

A final group of preferred polyamides comprises those which are composed of $a_1$) from 30 to 44, preferably from 32 to 40, in particular from 32 to 38, mol % of units which are derived from terephthalic acid, $a_2$) from 6 to 25, preferably from 10 to 21, in particular from 12 to 18, mol % of units which are derived from isophthalic acid, $a_3$) from 43 to 49.5, preferably from 46 to 48.5, in particular from 46.3 to 48.2, mol % of units which are derived from hexamethylenediamine and $a_4$) from 0.5 to 7, preferably from 1.5 to 4, in particular from 1.8 to 3.7, mol % of units which are derived from aliphatic cyclic diamines of 6 to 30, preferably 13 to 29, in particular 13 to 17, carbon atoms, the molar percentages of the components $a_1$) to $a_4$) together giving 100%.

The diamine units $a_3$) and $a_4$) are preferably reacted in about equimolar amounts with the dicarboxylic acid units $a_1$) and $a_2$).

Suitable monomers $a_4$) are preferably cylic diamines of the formula

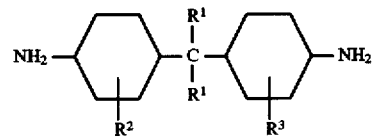

where $R^1$ to $R^3$ are each hydrogen or $C_1$–$C_4$-alkyl.

Particularly preferred diamines $a_4$) are bis(4-aminocyclohexyl)methane, bis(4-amino-3-methylcyclohexyl)methane, bis(4-aminocyclohexyl)-2,2-propane and bis(4-amino-3-methylcyclohexyl)-2,2-propane.

Examples of further monomers $a_4$) are 1,3- and 1,4-cyclohexanediamine and isophoronediamine.

In addition to the units $a_1$) to $a_4$) described above, the partly aromatic copolyamides may contain up to 20, preferably up to 10, in particular up to 4, % by weight of further polyamide-forming monomers $a_5$), as known from other polyamides.

Aromatic dicarboxylic acids as component $a_5$) are in general of 8 to 16 carbon atoms. Suitable aromatic dicarboxylic acids are, for example, substituted terephthalic and isophthalic acids, such as 3-tert-butylisophthalic acid, and polynuclear dicarboxylic acids, eg. 4,4'- and 3,3'-diphenyldicarboxylic acid, 4,4'- and 3,3'-diphenylmethanedicarboxylic acid, 4,440 - and 3,3'-dicarboxydiphenyl sulfone, 1,4- and 2,6-naphthalenedicarboxylic acid and phenoxyterephthalic acid.

Further polyamide-forming monomers $a_5$) may be derived from dicarboxylic acids of 4 to 16 carbon atoms and aliphatic diamines of 4 to 16 carbon atoms and from aminocarboxylic acids or corresponding lactams of 7 to 12 carbon atoms. Suitable monomers of these types which may be mentioned here include suberic acid, azelaic acid and sebacic acid as typical aliphatic dicarboxylic acids, 1,4-butanediamine, 1,5-pentanediamine and piperazine as typical diamines, and caprolactam, capryllactam, enantholactam, ω-aminoundecanoic acid and laurolactam as typical lactams and aminocarboxylic acids.

Partly aromatic copolyamides whose triamine content is less than 0.5, preferably less than 0.3, % by weight have also proven particularly advantageous.

Partly aromatic copolyamides prepared by most known processes (cf. U.S. Pat. No. 4,603,166) have triamine contents which are above 0.5% by weight, which leads to a deterioration in the product quality and to problems in the continuous preparation. An example of a triamine which gives rise to these problems is in particular dihexamethylenetriamine, which is formed from the hexamethylenediamine used in the preparation.

Copolyamides having a low triamine content have lower melt viscosities than products of the same composition which have a higher triamine content, the solution viscosity being the same. This considerably improves both the processibility and the product properties.

The melting points of the last-mentioned partly aromatic copolyamides are in general from 290° to 340° C., preferably from 292° to 330° C., this melting point being associated with a high glass transition temperature of, as a rule, more than 120° C., in particular more than 130° C. (in the dry state).

The partly aromatic copolyamides preferably have a crystallinity of >30%, preferably >35%, in particular >40%.

The crystallinity is a measure of the proportion of crystalline fragments in the copolyamide and is determined by X-ray diffraction or indirectly by measurement of $\Delta H_{cryst}$ Mixtures of different partly aromatic copolyamides may of course also be used, any desired mixing ratio being possible.

Suitable processes for the preparation of partly aromatic polyamides which can be used according to the invention are known to a person skilled in the art.

The batch process may be mentioned as a preferred preparation method. Here, the aqueous monomer solution is heated to 280°–340° C. in the course of from 0.5 to 3 hours in an autoclave, the resulting pressure of from 10 to 50, in particular from 15 to 40, bar being kept very constant for up to 2 hours by releasing excess steam. Thereafter, the autoclave is let down at constant temperature in the course of from 0.5 to 2 hours until a final pressure of from 1 to 5 bar has been reached. The polymer melt is then discharged, cooled and granulated.

Another preferred process is carried out similarly to the processes described in EP-A 129 195 and 129 196.

In these processes, an aqueous solution of the monomers $a_1$) to $a_4$) and, if required, $a_5$), having a monomer content of from 30 to 70, preferably from 40 to 65, % by weight, is heated to 280°–330° C. in the course of less than 60 seconds under superatmospheric pressure (from 1 to 10 bar) and with simultaneous evaporation of water and formation of a prepolymer, prepolymer and steam are then continuously separated, the steam is rectified and the entrained diamines are recycled. Finally, the prepolymer is passed into a polycondensation zone and is subjected to poly-condensation at superatmospheric pressure of from 1 to 10 bar and at from 280° to 330° C. in a residence time of from 5 to 30 minutes. Of course, the temperature in the reactor is above the melting point of the resulting prepolymer which is required at the relevant steam pressure.

These short residence times substantially prevent the formation of triamines.

The resulting polyamide prepolymer, which as a rule has a viscosity number of from 40 to 70, preferably from 40 to 60, ml/g, measured in a 0.5% strength by weight solution in 96% strength sulfuric acid at 25° C., is removed continuously from the condensation zone.

In a preferred procedure, the resulting polyamide prepolymer is passed in molten form through a discharge zone with simultaneous removal of the residual water contained in the melt. Suitable discharge zones are, for example, devolatilization extruders. The melt freed from the water in this manner is then extruded and the extrudates granulated.

These granules are subjected to continuous or batchwise solid-phase condensation under inert gas at below the melting point, for example at from 170° to 240° C., until the desired viscosity is reached. For example, tumbler dryers may be used for the batch-wise solid-phase condensation, and the continuous solid-phase condensation may be effected using heating tubes through which hot inert gas flows. The continuous solid-phase condensation is preferred, the inert gas used being nitrogen or in particular superheated steam, advantageously the steam obtained at the top of the column.

The viscosity number, measured in a 0.5% strength by weight solution in 96% strength sulfuric acid at 25° C. is in general from 100 to 500, preferably from 110 to 200, ml/g after the solid-phase postcondensation or after the other abovementioned preparation processes.

Component B

The novel thermoplastic molding materials contain, as polyglutarimide B, from 1 to 98.5, preferably from 5 to 94, % by weight of a polymethacrylimide (=polyglutarimide).

This is in general a polymer which is obtainable by reacting a poly(meth)acrylate with ammonia or with a primary amine and has a degree of imidation of more than 70%.

This polyglutarimide should accordingly contain at least 70% of units of the general formula I; the remainder comprises in general unchanged units of (meth)acrylate on which the starting polymer is based.

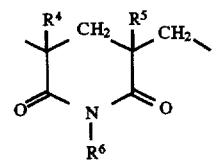

where $R^4$ and $R^5$ independently of one another are each hydrogen, $C_1$–$C_4$-alkyl or $C_6$–$C_{18}$-aryl and $R^6$ is hydrogen, $C_1$–$C_8$-alkyl, $C_5$–$C_{12}$-cycloalkyl or $C_6$–$C_{18}$-aryl.

Preferred radicals $R^4$ and $R^5$ are hydrogen and methyl.

This corresponds to a polymer B which is essentially composed of monomer units of methacrylates and/or acrylates and has subsequently been imidated.

Preferred radicals $R^6$ are hydrogen, $C_1$–$C_4$-alkyl, particularly preferably methyl, or cyclohexyl. Preferred aryl radicals of 6 to 18 carbon atoms are those which contain from 1 to 4 methylene groups as bridge members between nitrogen and the aromatic radical, benzyl being preferred.

In addition to acrylates and methacrylates, the polymers to be imidated may also contain minor amounts of other ethylenically unsaturated monomers, for example building blocks capable of imidation, such as acrylic acid, methacrylic acid, maleic anhydride and itaconic anhydride, and furthermore, for example, (meth)acrylonitrile, styrene and its alkyl derivatives substituted in the nucleus, ethylene, propylene and butadiene. The polymers to be imidated may be polymers produced in one or more stages, and the final stage in the last-mentioned polymers must contain groups which can be imidated.

In general, the polymers to be imidated contain at least 50, preferably more than 80, very particularly preferably from 95 to 100, % by weight of acrylates and/or methacrylates. Esters in which the ester moiety contains 1 to 20 carbon atoms are preferred. For economic reasons and owing to its ready accessibility, methyl methacrylate is particularly preferred. However, polymers obtained from monomer systems which contain at least 80% by weight of methyl methacrylate in addition to comonomers are also useful.

The weight average molecular weight of the polymers which are suitable as starting materials is determined according to DIN 7745 Part 1. The viscosity number VN of PMMA molding materials is determined, as usual, according to DIN 7745 Part 2 (2.6 g/l in $CHCl_3$ at 25° C.) and is advantageously from 30 to 100, preferably from 50 to 80, ml/g.

The polymers B having imido groups can be obtained by processes similar to those described in U.S. Pat. No. 4,246,374 and EP-A 234 726. This is a polymer-analogous reaction with suitable primary amines $R^6NH_2$ or ammonia:

Further suitable amines are cyclohexylamine, 2-amino-4, 6-dimethylpyridine, 3-aminophthalimide, 2-aminopyrimidine, 2-aminothiazole, 5-amino-1-H-tetrazole, aniline, bromoaniline, dibromoaniline, tribromoaniline, chloroaniline, dichloroaniline, trichloroaniline, p-phenetidine and p-toluidine.

The content of imido groups in the polyglutarimide B (degree of imidation) is in general at least 70, in particular from 80 to 95, % and can be calculated according to the following equation:

$$\text{Degree of imidation [\%]} = \frac{\text{N content from the elemental analysis}}{\text{theoretical N content at 100\% imidation}} \times 100\%$$

For a degree of imidation of 100%, the glutarimide structure forms the only repeating units in the polymer chain.

Component C

The novel molding materials contain, as component C, a polymeric component having hydroxyl groups. The experiments performed showed that in principle any group having proton donor properties should be suitable but that groups having the structural unit —OH are particularly useful. The compatibility-improving effect of the component C is very probably based on the fact that interactions, for example hydrogen bridge bonds, occur between the component C and the components A and B and improve the affinity of the phases for one another.

As stated above, all polymers having hydroxyl groups which are essentially freely available are in principle suitable. It should of course be ensured that the components A and B are stable in the presence of the component C. This should be noted in particular when compounds having acidic —OH groups are used.

When these preconditions are taken into account, certain groups of compounds have proven to be particularly advantageous and are described below. However, it is in principle possible also to use other components C, provided that the stability of the components A and B does not suffer as a result.

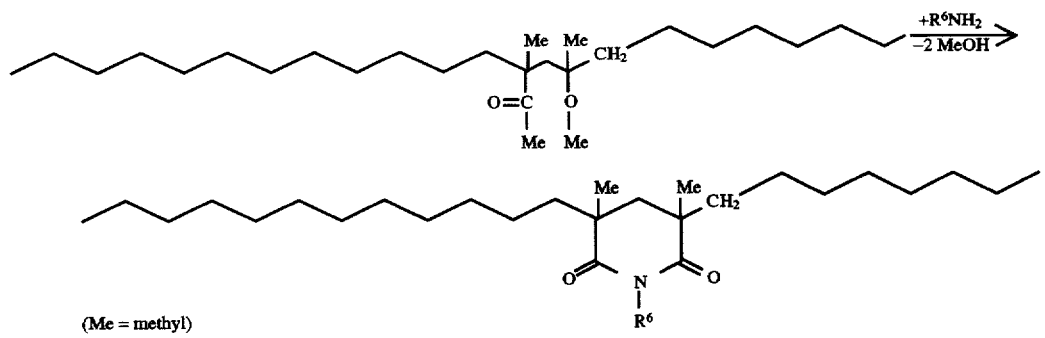

(Me = methyl)

Owing to their ready accessibility, ammonia and methylamine are the most preferable compounds of the formula $R^3NH_2$, but other amines can also be successfully used. Examples of other suitable amines are ethyl-, n-propyl-, n-butyl-, heptyl-, hexyl-, octyl-, nonyl-, decyl-, dodecyl-, hexadecyl-, octadecyl-, isobutyl-, sec-butyl-, tert-butyl, isopropyl-, 2-ethylhexyl-, phenethyl-, allyl-, benzyl-, para-chlorobenzyl- and dimethoxyphenethylamine, and alanine, glycine, 3'-aminoacetophenone, 2-aminoanthraquinone and p-aminobenzoic acid, as well as alkyl-substituted cyclohexylamines, such as trimethylcyclohexylamine.

The first group of particularly suitable polymers comprises polycondensates of aliphatic or aromatic diols or of alcohols having a higher functionality with epihalohydrins. Such compounds and processes for their preparation are known per se to a person skilled in the art, and further information is therefore unnecessary here. In principle, aliphatic or aromatic diols are suitable. Particularly preferred dihydroxy compounds are the diols used for the preparation of polycarbonates.

Owing to the ready accessibility, a polycondensate of bisphenol A and epichlorohydrin having the structure

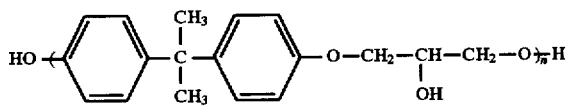

is preferably used.

In addition to the possibility of using polymers which already have the hydroxyl group in the main chain, it is also possible to use polymers or copolymers into which these functional groups are introduced by the concomitant use of suitable monomers during the polymerization, in which case the groups may be present in the polymers likewise in the main chain but also in substituents of the main chain. A further possibility comprises grafting suitable monomers having OH groups onto grafting bases, suitable grafting bases being in principle all polymers which are not completely incompatible with the components A and B. A certain degree of incompatibility can be compensated by increasing the proportion of hydroxyl groups.

Suitable components C are therefore, for example, polymers based on polyolefins, polystyrene and rubber elastomers which have hydroxyl groups —OH which are obtainable either by using suitable comonomers or by grafting on the functional groups —OH. The amount of comonomers or graft monomers having hydroxyl groups —OH is dependent on the level of compatibility of the base polymer with the components A and B. The better the compatibility, the lower may be the amount of OH groups. From the above, it is evident that a large number of polymers are suitable as component C, of which some particularly preferred types are described in detail below merely by way of example.

The first group comprises polymers and copolymers containing up to 100 mol % of vinylphenylcarbinols, vinylphenyldimethylcarbinols and in particular vinylphenylhexafluorodimethylcarbinol having proven particularly advantageous. Advantageous base polymers or grafting bases are in turn the abovementioned types of polymers.

A second group comprises the polymers and copolymers of this group with vinylphenols which may also contain substituents in the nucleus. Substituents which increase the acidity of the phenolic hydrogen are particularly suitable, for example halogen substituents as well as other electron-attracting substituents.

A third group comprises the phenol/formaldehyde polycondensates, provided that they are uncrosslinked and soluble. These products may be linear or branched.

In principle, polymers and copolymers with all polymerizable or graftable alcohols may also be mentioned.

It should be stated that polymers having hydroxyl groups and based on polyamides or polyglutarimides are particularly preferred since in this case the compatibility with at least the component A or B is present from the outset, so that the amount of OH groups can be reduced.

The component C can be prepared by conventional polycondensation, graft polymerization or copolymerization methods, and further information is therefore unnecessary here.

The amount of component C in the novel molding materials is from 0.5 to 30% by weight, based on the total weight of the components A to E, and depends on the compatibility of the base polymer with the components A and B. In general, amounts of from 1 to 25, in particular from 3 to 20, % by weight have proven particularly advantageous.

Component D

In addition to the components A, B and C, the novel molding materials may also contain further reinforcing agents or fillers, and the amount of these substances may be up to 60, preferably up to 45, in particular from 10 to 40, % by weight.

Suitable particulate fillers are amorphous silica, magnesium carbonate (chalk), powdered quartz, mica, talc, feldspar, glass beads and in particular calcium silicates, such as wollastonite and kaolin (in particular calcined kaolin), and carbon black.

Examples of fibrous reinforcing materials are potassium titanate whiskers, aramid fibers and in particular glass fibers. Where glass fibers are used, they may be provided with a size and an adhesion promoter to improve the compatibility with the matrix material.

The glass fibers may be incorporated both in the form of short glass fibers and in the form of rovings. In the finished injection molding, the average length of the glass fibers is preferably from 0.04 to 0.5 mm.

Preferred combinations of fillers are, for example, from 5 to 30% by weight of wollastonite or talc with from 1 to 10% by weight of glass fibers.

Component E

In addition to the components A to D, the novel molding materials may also contain up to 40, preferably up to 25, % by weight of a rubber impact modifier E.

Preferred elastomeric polymers are polymers which are based on olefins and are composed of the following components:

$e_1$) from 40 to 100% by weight of at least one α-olefin of 2 to 8 carbon atoms, $e_2$) from 0 to 50% by weight of a diene, $e_3$) from 0 to 45% by weight of a $C_1$–$C_{12}$-alkyl ester of acrylic acid or methacrylic acid or a mixture of such esters, $e_4$) from 0 to 40% by weight of an ethylenically unsaturated mono- or dicarboxylic acid or a functional derivative of such an acid, $e_5$) from 0 to 40% by weight of an epoxy-containing monomer and $e_6$) from 0 to 5% by weight of other monomers capable of free radical polymerization, with the proviso that the component C is not an olefin homopolymer.

The ethylene/propylene (EPM) and ethylene/propylene/diene (EPDM) rubbers, which preferably have a ratio of ethylene units to propylene units of from 40:60 to 90:10, may be mentioned as a first preferred group.

The Mooney viscosities (MLI+4/100° C.) of such, preferably uncrosslinked, EPM and EPDM rubbers (gel contents generally less than 1% by weight) are preferably from 25 to 100, in particular from 35 to 90 (measured using the large rotor after a running time of 4 minutes at 100° C. according to DIN 53 523).

EPM rubbers generally have virtually no double bonds, whereas EPDM rubbers may have from 1 to 20 double bonds per 100 carbon atoms.

Examples of diene monomers $e_2$) for EPDM rubbers are conjugated dienes, such as isoprene and butadiene, nonconjugated dienes of 5 to 25 carbon atoms, such as penta-1,4-diene, hexa-1,4-diene, hexa-1,5-diene, 2,5-dimethylhexa-1,5-diene and octa-1,4-diene, cyclic dienes, such as cyclopentadiene, cyclohexadienes, cyclooctadienes and dicyclopentadiene, and alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo(5.2.1.0.2.6)-3,8-decadiene, or mixtures thereof. Hexa-1,5-diene, 5-ethylidenenorbornene and dicyclopentadiene are preferred. The diene content of the EPDM rubbers is preferably from 0.5 bis 50, in particular from 2 to 20, particularly preferably from 3 to 15, % by weight, based on the total weight of the olefin polymer. EPM and EPDM rubbers can preferably also be grafted with reactive carboxylic acids or derivatives thereof. Particular examples of these are acrylic acid, methacrylic acid and derivatives thereof as well as maleic anhydride.

A further group of preferred olefin polymers comprises copolymers of α-olefins of 2 to 8 carbon atoms, in particular of ethylene, with $C_1$–$C_{18}$-alkyl esters of acrylic acid and/or methacrylic acid.

All primary and secondary $C_1$–$C_{18}$-alkyl esters of acrylic acid or methacrylic acid are in principle suitable, but esters of 1 to 12, in particular 2 to 10, carbon atoms are preferred.

Examples of these are methyl, ethyl, propyl, n-butyl, isobutyl, 2-ethylhexyl, octyl and decyl acrylates and the corresponding esters of methacrylic acid. Among these, n-butyl acrylate and 2-ethylhexyl acrylate are particularly preferred.

The amount of the methacrylates and acrylates $e_3$) in the olefin polymers is 0–60, preferably 10–50, in particular 30–45, % by weight.

Instead of the esters $e_3$), or in addition to these, the olefin polymers may also contain ethylenically unsaturated mono- or dicarboxylic acids $e_4$) having acid functional groups and/or latent acid functional groups or epoxy-containing monomers $e_5$).

Examples of monomers $e_4$) are acrylic acid, methacrylic acid, tertiary alkyl esters of these acids, in particular tert-butyl acrylate, and dicarboxylic acids, such as maleic acid and fumaric acid, or derivatives of these acids and monoesters thereof.

Monomers having latent acid functional groups are to be understood as compounds which form free acid groups under the polymerization conditions or on incorporation of the olefin polymers into the molding materials. Examples of these are anhydrides of dicarboxylic acids of up to 20 carbon atoms, in particular maleic anhydride, and tertiary $C_1$–$C_{12}$-alkyl esters of the abovementioned acids, in particular tert-butyl acrylate and tert-butyl methacrylate.

The monomers having acid functional groups or latent acid functional groups and the epoxy-containing monomers are preferably incorporated in the olefin polymers by adding to the monomer mixture compounds of the general formulae I–IV

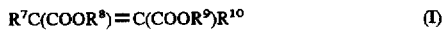
(I)

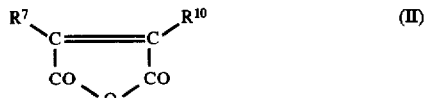
(II)

(III)

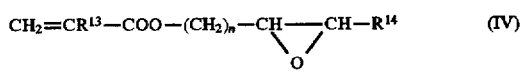
(IV)

where $R^7$ to $R^{14}$ are each hydrogen or alkyl of 1 to 6 carbon atoms, m is an integer from 0 to 20 and n is an integer from 0 to 10.

$R^7$ to $R^{12}$ are each preferably hydrogen, m is preferably 0 or 1 and n is preferably 1. The corresponding compounds are maleic acid, fumaric acid or maleic anhydride $e_4$) and alkenyl glycidyl ether or vinyl glycidyl ether $e_5$).

Preferred compounds of the formulae I, II, III and IV are maleic acid and maleic anhydride as component $e_4$) and epoxy-containing esters of acrylic acid and/or methacrylic acid, glycidyl acrylate and glycidyl methacrylate (as component $e_5$) being particularly preferred.

The amount of the components $e_4$) and $e_5$) is in each case from 0.07 to 40, in particular from 0.1 to 20, particularly preferably from 0.15 to 15, % by weight, based on the total weight of the olefin polymers.

Particularly preferred olefin polymers are those comprising from 50 to 98.9, in particular from 60 to 95, % by weight of ethylene, from 0.1 to 20, in particular from 0.15 to 15, % by weight of glycidyl acrylate and/or glycidyl methacrylate, acrylic acid and/or maleic anhydride and from 1 to 45, in particular from 10 to 35, % by weight of n-butyl acrylate and/or 2-ethylhexyl acrylate.

Further preferred esters of acrylic and/or methacrylic acid are the methyl, ethyl, propyl and isobutyl esters.

Examples of suitable other monomers $e_6$) are vinyl esters and vinyl ethers.

The preparation of the ethylene copolymers described above can be carried out by processes known per se, preferably by random copolymerization under high pressure and at elevated temperatures.

The melt flow index of the ethylene copolymers is in general from 1 to 80 g/10 min (measured at 190° C. and under a load of 2.16 kg).

In addition to the above preferred elastomeric polymers based on olefins, suitable elastomers E are, for example, emulsion polymers, the preparation of which is described, for example, in Houben-Weyl, Methoden der organischen Chemie, Volume XII. I (1961), and by Blackley in the monograph Emulsion Polymerization.

Random elastomers or those having a shell morphology can in principle be used. The shell morphology is determined by the order of addition of the individual monomers.

Examples of monomers for the preparation of the elastomers are acrylates, such as n-butyl acrylate and 2-ethylhexyl acrylate, corresponding methacrylates and mixtures thereof. These monomers can be copolymerized with further monomers, such as styrene, acrylonitrile, vinyl ethers and further acrylates or methacrylates, such as methyl methacrylate, methyl acrylate, ethyl acrylate and propyl acrylate.

The use of emulsion polymers which have reactive groups at the surface is advantageous. Such groups are, for example, epoxy, carboxyl, latent carboxyl, amino and amido groups.

The graft monomers described in EP-A 208 187 are also suitable for introducing reactive groups at the surface.

The emulsion polymers may furthermore be completely or partially crosslinked. Examples of monomers which act as crosslinking agents are buta-1,3-diene, divinylbenzene, diallyl phthalate and dihydrodicyclopentadienyl acrylate and the compounds described in EP-A 50 265.

It is also possible to use graft-linking monomers, ie. monomers having two or more polymerizable double bonds which react at different rates in the polymerization.

Examples of such graft-linking monomers are allyl-containing monomers, in particular allyl esters of ethylenically unsaturated carboxylic acids, such as allyl acrylate, allyl methacrylate, diallyl maleate, diallyl fumarate, diallyl itaconate and the corresponding monoallyl compounds of these dicarboxylic acids. There is also a large number of further suitable graft-linking monomers; for further details, reference may be made in this context to, for example, U.S. Pat. No. 4,148,846.

In general, the amount of these crosslinking monomers in the component E is up to 5, preferably not more than 3, % by weight, based on E.

Examples of preferred emulsion polymers are n-butyl acrylate/(meth)acrylic acid copolymers, n-butyl acrylate/glycidyl acrylate or n-butyl acrylate/glycidyl methacrylate copolymers and graft polymers having an inner core of n-butyl acrylate and an outer shell of the abovementioned copolymers.

The elastomers E described may also be prepared by other conventional processes, for example by suspension polymerization.

Siloxane-based graft rubbers may also be used.

Suitable siloxane cores can be prepared, for example, starting from cyclic oligomeric octamethyltetrasiloxane or tetravinyltetramethyltetrasiloxane. These may be reacted, for example, with γ-mercaptopropylmethyldimethoxysilane in a ring-opening cationic polymerization, preferably in the presence of sulfonic acids, to give the soft siloxane cores. The siloxanes may also be crosslinked, for example by carrying out the polymerization reaction in the presence of silanes having hydrolyzable groups, such as halogen or alkoxy, eg. tetraethoxysilane, methyltrimethoxysilane or phenyltrimethoxysilane. Examples of suitable comonomers here are styrene, acrylonitrile and crosslinking or graft-linking monomers having more than one polymerizable double bond, such as diallyl phthalate, divinylbenzene, butanediol diacrylate or triallyl (iso)cyanurate. The hard components are derived in general from styrene, α-methylstyrene and copolymers thereof, preferred comonomers here being acrylonitrile, methacrylonitrile and methyl methacrylate.

A further group of suitable impact modifiers comprises thermoplastic polyester elastomers. Polyester elastomers are understood as meaning segmented copolyether esters which contain long-chain segments derived as a rule from poly(alkylene) ether glycols and short-chain segments derived from low molecular weight diols and dicarboxylic acids. Such products are known per se and are described in the literature, for example in U.S. Pat. No. 3,651,014. Corresponding products are also commercially available under the names Hytrel® (Du Pont), Arnitel® (Akzo) and Pelprene® (Toyoho Co. Ltd.).

Other suitable impact modifiers are thermoplastic polyurethane elastomers. Their preparation is known to a person skilled in the art.

Mixtures of different rubbers can of course also be used.

In addition to the essential components A and B and, if desired, C, D and E, the novel molding materials may contain conventional additives and processing assistants F. Their amount is in general up to 40, preferably up to 15, % by weight, based on the total weight of the components A to E.

Conventional additives are, for example, stabilizers and antioxidants, heat stabilizers and UV stabilizers, lubricants and mold release agents, dyes and pigments and plasticizers.

Pigments and dyes are generally present in amounts of up to 4, preferably from 0.5 to 3.5, in particular from 0.5 to 3, % by weight.

The pigments for coloring thermoplastics are generally known; cf. for example R. Gächter and H. Müller, Taschenbuch der Kunststoff-additive, Carl Hanser Verlag, 1983, pages 494 to 510. A first preferred group of pigments comprises white pigments, such as zinc oxide, zinc sulfide, lead white (2 $PbCO_3 \cdot Pb(OH)_2$), lithopone, antimony white and titanium dioxide. Among the two most commonly used crystal modifications of titanium dioxide (rutile and anatase types), the rutile form is used in particular for imparting a white color to the novel molding materials.

Black pigments which may be used according to the invention are iron oxide black ($Fe_3O_4$), spinel black (Cu(Cr, Fe)$_2O_4$), manganese black (mixture of manganese dioxide, silica and iron oxide), cobalt black and antimony black and particularly preferably carbon black, which is generally used in the form of furnace black or gas black (in this context, cf. G. Benzing, Pigmente für Anstrichmittel, Expert-Verlag (1988), page 78 et seq.).

Inorganic colored pigments, such as chromium oxide green, or organic colored pigments, such as azo pigments and phthalocyanines, may of course be used according to the invention for establishing certain hues. Such pigments are in general commercially available.

It may also be advantageous to use the stated pigments or dyes as a mixture, for example carbon black with copper phthalocyanines, since the dispersing of the colorants in the thermoplastic is generally facilitated.

Antioxidants and heat stabilizers which can be added to the thermoplastic materials according to the invention are, for example, halides of metals of group I of the Periodic Table, for example sodium halides, potassium halides and lithium halides, if necessary in combination with copper(I) halides, for example chlorides, bromides and iodides. The halides, in particular of copper, may also contain electron-rich π ligands. Examples of such copper complexes are copper halide complexes with, for example, triphenylphosphine. Zinc fluoride and zinc chloride may also be used. Sterically hindered phenols, hydroquinones, substituted members of this group, secondary aromatic amines, if required in combination with phosphorus-containing acids or the salts thereof, and mixtures of these compounds may also be used, preferably in concentrations of up to 1% by weight, based on the weight of the mixture.

Examples of UV stabilizers are various substituted resorcinols, salicylates, benzotriazoles and benzophenones, which are generally used in amounts of up to 2% by weight.

Lubricants and mold release agents, which as a rule are added in amounts of up to 1% by weight of the thermoplastic material, are stearic acid, stearyl alcohol, alkyl stearates and stearamides as well as esters of pentaerythritol with long-chain fatty acids. Calcium salts, zinc salts or aluminum salts of stearic acid and dialkyl ketones, eg. distearyl ketone, may also be used.

The novel thermoplastic molding materials can be prepared by processes known per se, by mixing the starting components in a conventional mixing apparatus, such as an extruder, a Brabender mill or a Banbury mill, or a kneader and then extruding the mixture.

The extrudate is usually cooled after the extrusion and is comminuted.

The order in which the components are mixed may be varied; for example, two or, if required, three components may be premixed, but it is also possible to mix all components together.

Thorough mixing is advantageous for obtaining a very homogeneous molding material. Average mixing times of from 0.2 to 30 minutes at from 270° to 360° C. are generally required for this purpose.

The novel molding materials are distinguished by high rigidity at above 80° C. and very good mechanical properties. Owing to the stated properties, the novel molding materials are particularly suitable for the production of moldings for the electrical and electronics sectors and automotive and apparatus construction.

EXAMPLES

Preparation of the components $A_{1-6}$

The preparation of the partly aromatic copolyamides used as component A is described in detail below, and the composition of the products is shown in Table 1. The specific heat of fusion $\Delta H_{cryst}$ was determined by differential scanning calorimetry (DSC 9900, Du Pont) at a heating rate of 20° C./min, as a relative measure of the crystallinity.

Component $A_1$

A 60% strength aqueous solution consisting of terephthalic acid, isophthalic acid, hexamethylenediamine or bis(4-amino-3-methylcyclohexyl)methane or bis(4-aminocyclohexyl)methane, in the ratios shown in the table, was transported from a heatable storage container at about 80° C. at a rate corresponding to 5 kg/hour of polyamide, by means of a metering pump, into a tubular evaporator arranged partly horizontally and partly vertically. The evaporator was heated by means of a fluid heating medium which had a temperature of 326° C., with vigorous circulation. The evaporator had a length of 3 m, a capacity of 180 ml and a heat transfer area of about 1300 cm². The residence time in the evaporator was 50 s. The mixture of prepolymer and steam emerging from the evaporator was at 310° C. and was separated into steam and melt in a separator. The melt remained in the separator for a further 10 minutes and was then extruded by means of an extruder having a devolatilization zone, and the extrudates were solidified in a water bath and then granulated. The separator and the evaporator zone were kept at 5 bar by a pressure regulating means which was arranged downstream of the column. The steam separated off in the separator was fed to a packed column which had about 10 theoretical plates and to the top of which about 1l of vapor condensate per hour was fed in order to generate a reflux. The resulting temperature at the top of the column was 152° C. The steam emerging after the letdown valve was condensed and contained less than 0.05% by weight of hexamethylenediamine. An aqueous solution of hexamethylenediamine which contained 80% by weight of hexamethylenediamine, based on each case on polyamide produced, was obtained at the bottom of the column. This solution was recycled to the starting salt solution by means of a pump, before the entry into the evaporator.

After the polymer melt had emerged from the separator, the polyamide had a very pale natural color and a viscosity number of 48 ml/g (measured as a 0.5% strength solution at 25° C. in 96% strength by weight $H_2SO_4$ according to DIN 53 246.

The product had roughly equivalent amounts of carboxyl and amino terminal groups.

In the extruder, the melt was then let down to atmospheric pressure and underwent virtually no further condensation during a residence time of less than 1 minute.

The products were then heated in the solid phase in a stationary heating tube (double-walled glass tube which is heated externally with oil to the required temperature and has an internal diameter of 120 mm and a length of 1000 mm and through which 120 l/min of superheated steam flow) batchwise at 200° C. until the viscosity number reached 112 ml/g. The residence time was from 8 to 18 hours. In the course of this heating, a major part of the extractable residual monomers was, if desired, also extracted by the steam.

Component $A_2$ 2 kg of a monomer mixture corresponding to Example 1 were initially taken with 700 ml of water in a 5 l laboratory autoclave. The mixture was distributed in 5 glass tubes, each having a capacity of 800 ml. The autoclave was heated to 350° C. for 1 hour, the resulting steam pressure being kept constant, after reaching 20 bar, by releasing excess water. The temperature and pressure were then kept constant for a further hour. The autoclave was then cooled to 330° C. and let down to atmospheric pressure. The heating of the autoclave was switched off, room temperature being reached after about 3 hours.

The glass tubes were removed from the autoclave and their content was coarsely milled. The product obtained was subjected to solid-phase postcondensation at 198° C. under nitrogen for 10 hours until the viscosity number reached 115 ml/g.

Component $A_3$ 3 kg of a monomer mixture which gave the polymer shown in the table were initially taken with 2500 ml of water in a 10 l laboratory autoclave. The preparation and working up were carried out as for component $A_2$. After the solid-phase postcondensation under nitrogen at 196° C. for 10 hours, the copolyamide had a viscosity number of 114 ml/g.

Component A/V

Aliphatic polyamide obtained from 1,6-diaminohexane and adipic acid and having a K value (according to Fikentscher) of 76, corresponding to a relative viscosity $\eta_{rel}$ of 2.95, measured in 1% strength by weight solution in 96% strength sulfuric acid at 25° C.

Components $B_1$ and $B_2$

Commercial poly-N-methylglutarimides which are characterized by the following data were used:

|  | $B_1$ | $B_2$ |
| --- | --- | --- |
| Degree of imidation | 74% | 87% |
| Glass transition temperature Tg | 144° C. | 160° C. |
| Vicat B | 135° C. | 150° C. |
| Viscosity number | 82 ml/g | 70 ml/g |

Component C

Condensate of bisphenol A and epichlorohydrin, having a relative viscosity of 1.13, measured in a 0.5% strength by weight solution in dichloromethane at 23° C. (Phenoxy® from Union Carbide Corporation).

Component E

Ethylene/propylene rubber grafted with 0.7% by weight of maleic anhydride and having a melt flow index of 3 g/10 min, measured at 2.16 kg and 230° C. (commercial product Exxelor VA/1803 from Exxon).

TABLE 1

Composition of the partly aromatic copolyamides used

|  |  | $A_1$ | $A_2$ | $A_3$ |
| --- | --- | --- | --- | --- |
| Hexamethylene- | mol % | 48.1 | 48.1 | 46.2 |
| diamine | % by weight | 39.1 | 39.1 | 36.9 |
| Terephthalic | mol % | 32.2 | 32.2 | 29.5 |
| acid | % by weight | 37.5 | 37.5 | 34.0 |
| Isophthalic | mol % | 17.8 | 17.8 | 20.5 |
| acid | % by weight | 20.6 | 20.6 | 23.6 |
| bis(4-Aminocyclo- | mol % | 1.9 | 1.9 | 3.8 |
| hexyl)methane | % by weight | 2.8 | 2.8 | 5.5 |
| $\Delta H_{cryst}$ | [J/g] | 54 | 52 | 32 |

The individual components in the examples below were mixed in a twin-screw extruder at a melt temperature of from 300° to 340° C. The melt was passed through a water bath and granulated.

The dried granules were processed at from 300° to 340° C. to give tensile test bars, circular disks and standard small bars.

The rigidity (modulus of elasticity) and elongation at break of the blends were determined by a tensile test according to DIN 53 455, using dumbbells, at 23° C.

Furthermore, the rigidity of the samples saturated with moisture was determined at 80° C.

The notched impact strength of the blends was determined according to DIN 53 353 on standard small bars. The damaging energy of the samples was determined according to DIN 53 443 on circular disks.

The Vicat B heat distortion resistance of the blends was determined according to DIN 53 460 on standard small bars.

The composition of the molding materials and the results of the tests are shown in Tables 2 and 3.

TABLE 2

| | Example No. | | | | | | |
|---|---|---|---|---|---|---|---|
| | 1V | 2V | 3V | 4V | 1 | 2 | 5V |
| Component [% by wt.] | | | | | | | |
| $A_1$ | 50 | — | — | — | 47.5 | — | — |
| $A_2$ | — | 50 | — | — | — | 47.5 | — |
| $A_3$ | — | — | 50 | — | — | — | 47.5 |
| A/V | — | — | — | 50 | — | — | — |
| $B_1$ | 50 | 50 | 50 | 50 | 47.5 | 47.5 | 47.5 |
| C | — | — | — | — | 5 | 5 | 5 |
| Properties: | | | | | | | |
| E [N/mm²] at RT | 3650 | 3650 | 3400 | 3450 | 3400 | 3370 | 3100 |
| εR [%] | 2.7 | 2.6 | 2.4 | 2.5 | 21 | 22 | 18 |
| E [N/mm²] at 80° C. | 2400 | 2350 | 1700 | 800 | 2300 | 2260 | 1550 |
| $a_k$ [kJ/m²] | 2.0 | 2.1 | 1.8 | 1.8 | 6.5 | 7.0 | 5.9 |
| $W_s$ [Nm] | 0.2 | 0.1 | 0.1 | 0.1 | 27 | 25 | 21 |

V: Comparative Examples

TABLE 3

| | Example No. | | | |
|---|---|---|---|---|
| | 6V | 3 | 4 | 5 |
| Component [% by wt.] | | | | |
| $A_1$ | 50 | 49 | 47.5 | 45 |
| $B_2$ | 50 | 49 | 47.5 | 45 |
| C | — | 2 | 5 | 5 |
| E | — | — | — | 5 |
| Properties: | | | | |
| E [N/mm²] at RT | 3850 | 3700 | 3600 | 3450 |
| εR [%] | 2.4 | 11 | 20 | 26 |
| E [N/mm²] at 80° C. | 2650 | 2500 | 2400 | 2300 |
| $a_k$ [kJ/m²] | 2.0 | 4.2 | 6.4 | 12 |
| $W_s$ [Nm] | 0.1 | 16 | 24 | 34 |

V: Comparative Examples

The results show that the desired combination of properties is obtained only by the joint use of a partly aromatic copolyamide in the claimed composition.

We claim:

1. A thermoplastic molding material containing

A) from 1 to 98.5% by weight of a partly aromatic copolyamide,

B) from 1 to 98.5% by weight of a polymethacrylimide,

C) from 0.5 to 30% by weight of a polycondensate of aliphatic or aromatic polyhydric alcohols with epihalohydrins, D) from 0 to 60% by weight of fibrous or particulate fillers or mixtures thereof, E) from 0 to 40% by weight of rubber impact modifiers and F) from 0 to 40% by weight of conventional additives and processing assistants.

2. A thermoplastic molding material as defined in claim 1, containing, as component A, a partly aromatic copolyamide composed of $a_1$) from 30 to 44 mol % of units which are derived from terephthalic acid, $a_2$) from 6 to 25 mol % of units which are derived from isophthalic acid, $a_3$) from 43 to 49.5 mol % of units which are derived from hexamethylenediamine and $a_4$) from 0.5 to 7 mol % of units which are derived from liphatic cyclic diamines of 6 to 30 carbon atoms, the molar percentages of the components $a_1$) to $a_4$) together giving 100%.

3. A fiber, film or molding formed from a thermoplastic molding material as defined in claim 1.

* * * * *

UNITED STATES PATENT AND TRADEMARK OFFICE
CERTIFICATE OF CORRECTION

PATENT NO.: 5,710,216

DATED: January 20, 1998

INVENTOR(S): WEBER et al.

It is certified that error appears in the above-identified patent and that said Letters Patent is hereby corrected as shown below:

Column 16, claim 2, line 56, "liphatic" should be --aliphatic--.

Signed and Sealed this

Thirty-first Day of March, 1998

Attest:

BRUCE LEHMAN

Attesting Officer

Commissioner of Patents and Trademarks